United States Patent [19]

Howell, III

[11] Patent Number: 4,522,366

[45] Date of Patent: Jun. 11, 1985

[54] VASE LOCKING DEVICE

[76] Inventor: George B. Howell, III, 1036 S. Sterling, Tampa, Fla. 33609

[21] Appl. No.: 519,844

[22] Filed: Aug. 3, 1983

[51] Int. Cl.³ .............................................. F16M 13/00
[52] U.S. Cl. .................................... 248/551; 47/41 G; 47/41.1; D99/19; 248/27.8; 248/558
[58] Field of Search ....................... 248/27.8, 500, 506, 248/551, 552, 553, 507, 154, 558; 220/327; 47/41.1, 41 G; D99/5, 19; 211/1.3, 2

[56] References Cited

U.S. PATENT DOCUMENTS

| D. 186,236 | 9/1959 | O'Brien | D99/5 |
|---|---|---|---|
| 996,137 | 6/1911 | Praeger | 248/506 X |
| 1,541,983 | 6/1925 | McGowan . | |
| 1,874,185 | 8/1932 | Goldstein . | |
| 1,973,102 | 9/1934 | Reep . | |
| 2,562,726 | 7/1951 | McDonald et al. . | |
| 2,676,434 | 4/1954 | Carlson | 47/41.1 |
| 3,001,326 | 9/1961 | O'Brien et al. | D99/19 |
| 3,065,947 | 11/1962 | Thompson . | |
| 3,229,948 | 1/1966 | King . | |
| 3,312,014 | 4/1967 | Pfister | 47/41.1 |
| 3,328,914 | 7/1967 | Newman | 47/41.1 |
| 3,351,310 | 11/1967 | Turner | 47/41.1 |
| 3,434,235 | 3/1969 | Gordon et al. | 47/41.1 |

Primary Examiner—J. Franklin Foss
Assistant Examiner—David L. Talbott
Attorney, Agent, or Firm—A. W. Fisher, III

[57] ABSTRACT

A vase locking device for use with a grave or monument to alternately secure a combination vase and base in either the stored or upright position comprising an adaptor apparatus including a first and second adaptor element and a lower lock member selectively coupled together by an interconnecting member such that the vase locking device secures the vase to the base in the stored position with the first adaptor element and the vase and base in the upright position with the second adaptor element.

7 Claims, 3 Drawing Figures

U.S. Patent    Jun. 11, 1985    4,522,366

VASE LOCKING DEVICE

BACKGROUND OF THE INVENTION

1. Field of the Invention

A vase locking device for use with a grave or monument to alternately secure a combination vase and base in either the stored or upright position.

2. Description of the Prior Art

The use of vase and base combinations have long been known with graves and monuments. Unfortunately, such vases are often stolen. Despite efforts to provide means to prevent such theft, problems of theft continue without abatement. Unfortunately, non of these are adequate. The following are examples of various vases and efforts to protect, stabilize and secure same: U.S. Pat. No. 1,541,983; U.S. Pat. No. 1,874,185; U.S. Pat. No. 1,973,102; U.S. Pat. No. 2,562,726; U.S. Pat. No. 3,065,947; U.S. Pat. No. 3,229,948; and U.S. Pat. No. 186,236.

SUMMARY OF THE INVENTION

The present invention relates to a vase locking device for use with a grave or monument to alternately secure a combination vase and base either in the stored or upright position.

The vase locking device comprises an adaptor apparatus including a first adaptor element to secure the vase locking device to the vase when the vase is in the stored position, and a second adaptor element to secure the vase locking device to the vase when in the upright position.

Both the first and second adaptor element include externally threaded portions to be received within the base of the vase and an internally threaded portion or recess to receive an interconnecting member.

A lower lock member comprising a base member having a locking element affixed to one surface thereof is attached to the base. An aperture is coaxially formed in the base member and locking element to receive a portion of the interconnecting member.

The interconnecting member comprises an elongated externally threaded element having a wing nut operatively mounted thereon and a lock nut or element disposed at one end thereof.

To store the vase within the base while in the ground or monument, the first adaptor element is threaded into the vase. The elongated externally threaded element of the interconnecting member is then threaded into the recess. Once the interconnecting member is thus secured to the first adaptor element, the vase is inverted and placed within the base such that the lock nut and wing nut are passed through the aperture formed in the lower lock member. Thus configured the vase cannot readily be removed from the base since the wing nut is normally biased to the opened or spread position. To unlock or remove the vase from the base, the wing nut is moved relative to the lower lock element. The vase is then turned until the wing nut moves downward to engage the lock element. As the vase is turned or rotated further, the interconnecting members are withdrawn from the threaded recess until the vase and interconnecting member are separated. Thus, the vase can be removed from the base.

To secure the vase to the base in the upright position, the second adaptor is threaded into the vase. The elongated externally threaded element of the interconnecting member is then threaded into the threaded recess. Once the interconnecting members are thus secured to the second adaptor element extending outwardly from the vase, the vase is placed on top of the base so that the lock nut and wing nut are passed through the aperture formed in the lower lock member. Thus configured the vase cannot readily be removed from the base since the wing nut is normally biased to the opened or spread position. To unlock or remove the vase from the base, the procedure identical to that previously described with respect to the stored configuration is accomplished.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
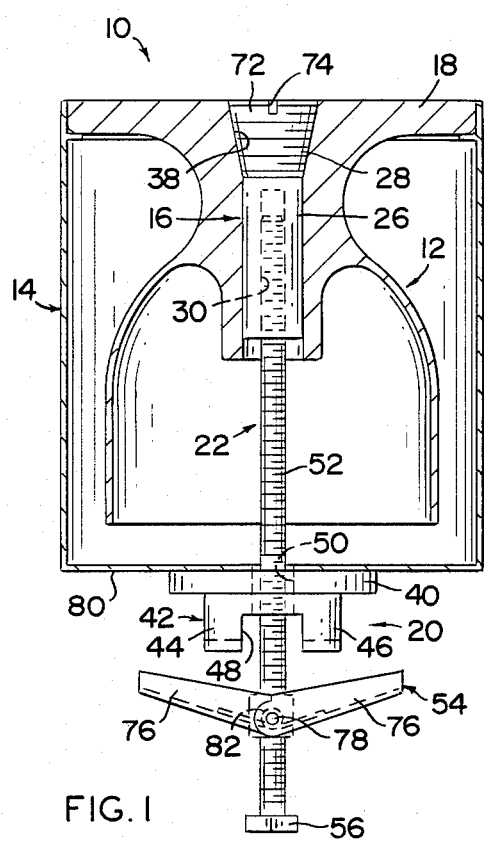
FIG. 1 is a side view of the vase locking device in combination with the vase and base in the stored position.
Figure 2:
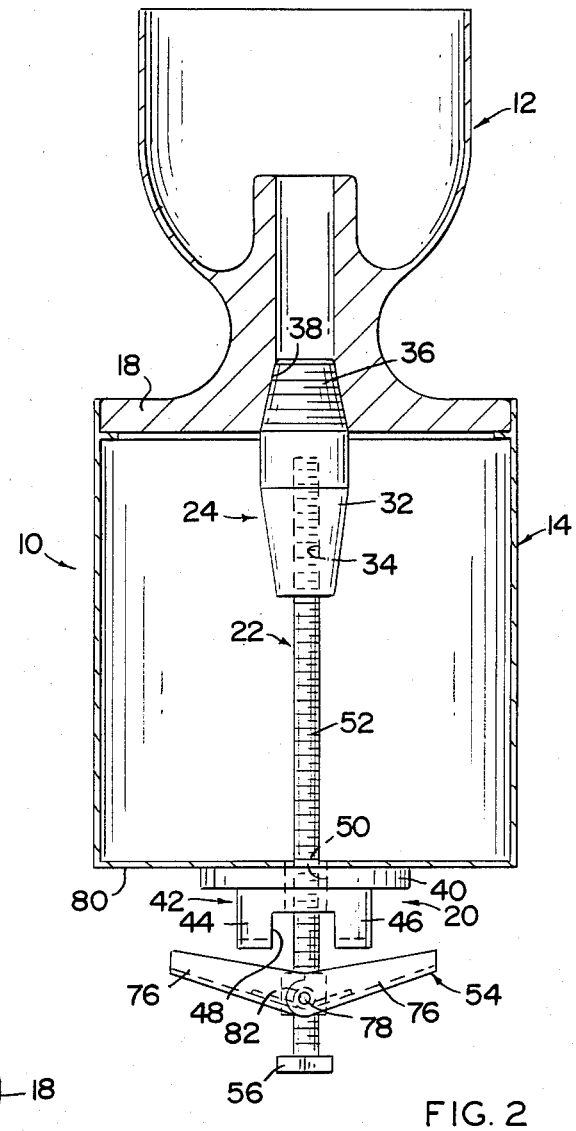
FIG. 2 is a side view of the vase locking device in combination with the vase and base in the upright position.

As more fully described hereinafter, the present invention relates to a vase locking device generally indicated as 10 for use with a grave or monument to alternately secure a combination vase 12 and base 14 in either the stored position shown in FIG. 1, or in the upright position as shown in FIG. 2.

The vase locking device 10 comprises an adaptor apparatus including a first adaptor element 16 to secure the vase locking device 10 to the base 18 of the vase 12 when the vase is in the stored position, and a lower lock member 20 selectively coupled together by interconnecting member 22 (FIG. 1). The adaptor apparatus further includes a second adaptor element 24 to secure the vase 12 to the base 14 when in the upright position (FIG. 2).

The first adaptor element 16 comprises a body 26 having one end portion externally threaded 28 and the opposite end portion having an internally threaded recess 30 formed therein to receive a portion of the interconnecting member 22 as more fully described hereinafter. The second adaptor element 24 comprising a cylindrical body 32 having a threaded recess 34 extending substantially the length thereof in combination with the externally threaded end portion 36 to be received in threaded recess 38 of the base 18 of the vase 12 to secure the vase 12 to the base 14 when in the upright position.

The lower lock member 20 comprises a substantially annular base 40 having a locking element 42 affixed to one surface thereof. The locking element 42 comprises a substantially U-shaped configuration to form a first and second element 44 and 46 respectively to cooperatively form a key-way or channel 48 therebetween. An aperture 50 is coaxially formed in the base 40 and locking element 42 to receive a portion of the interconnecting member 22 as more fully described hereinafter.

The interconnecting member 22 comprises an elongated externally threaded element 52 having a wing nut 54 operatively mounted thereon. Adjacent to one end portion of the externally threaded elongated element 52 is a lock nut or element 56.

Figure 3:
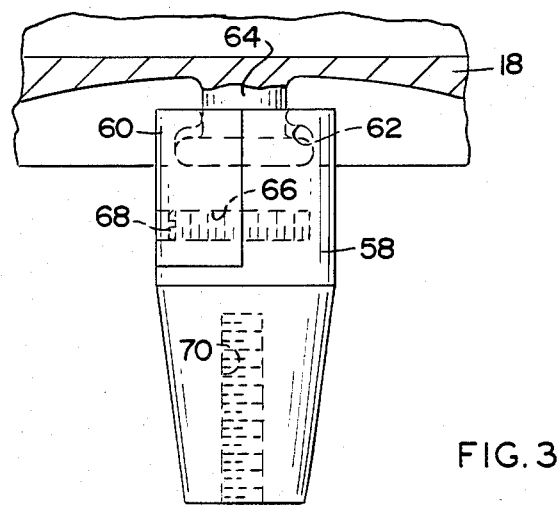
FIG. 3 is a detailed side view of an alternate embodiment of the second adaptor element.

FIG. 3 shows an alternate embodiment of the second adaptor element 24 comprising a base member 58 and a secondary base member 60 wherein a recess 62 is formed therein in cooperative configuration to engage the button 64 formed in the base 18 of the vase 12. A connector recess 66 extends through the secondary base member 60 into the primary or base member 58 to receive a fastening means 68 therebetween as more fully described hereinafter. The opposite end of the base member 58 includes a threaded recess 70 to receive an end portion of the interconnecting member 22 as described more fully hereinafter.

To store the vase 12 within the base 14 while in the ground or monument, the first adaptor element 16 is threaded into the threaded recess 38 within the base 18 of the vase 12. The outer end 72 of the first adaptor element 16 may include a slot 74 to facilitate use of a screw driver in tightening the first adaptor element 16 within the threaded recess 38. The elongated externally threaded element 52 is then threaded into threaded recess 30. Once the interconnecting member 22 is thus secured to the first adaptor element 16 within the vase 12, the vase 12 is inverted and placed within the base 14 such that the lock nut or element 56 and wing nut 54 including wing element 76 pivotally coupled together by pin 78 are passed through aperture 50 formed as the lower lock member 20. As shown the lower lock member 20 is affixed to the lower surface 80 of the bottom of the base 14. Thus configured the vase 12 cannot readily be removed from the base 14 since the wing elements 76 are normally biased to the open or spread position by a spring or bias or bias means 82. To unlock or remove the vase 12 from the base 14, the wing elements 76 are aligned in the key-way or channel 48. The vase 12 is then turned until the wing nut 54 moves downward to engage lock element 56. As the vase 12 is turned or rotated further the interconnecting member 22 is withdrawn from the threaded recess 38 until the vase 12 and interconnecting member 22 are separated thus permitting the vase 12 to be removed from the base 14.

To secure the vase 12 to the base 14 in the upright position as shown in FIG. 2, the second adaptor 24 is threaded into the threaded recess 38 within the base 18 of the vase 12. The elongated externally threaded element 52 is then threaded into threaded recess 30. Once the interconnecting member 22 is thus secured to the second adaptor element 24 extending outwardly from the base 18 of the vase 12, the vase 12 is placed on top of the base 14 such that the lock nut or element 56 and wing nut 54 including wing element 76 pivotally coupled together by pin 78 are passed through aperture 50 formed in the lower lock member 20 such that the interconnecting member 22 extends the length of the base 14. Thus configured the vase 12 cannot readily be removed from the base 14 since the wing nut 54 is normally biased to the open or spread position. To unlock or remove the vase 12 from the base 14 the procedure identical to that previously described with respect to the stored configuration is accomplished.

The alternate embodiment of the second adaptor element 24 functions essentially in the same manner as the second adaptor element 24 shown in FIG. 3 except that the base member 58 in secondary base member 60 are placed around the button 64 and secured to each other by fastening means 68 thus affixing the second adaptor element 24 to the base 18 of the vase 12. The application of the interconnecting member 22 and the locking procedure is otherwise essentially the same as that of the principal embodiment of the second adaptor element 24.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A vase locking device for use with a grave or monument to alternately secure a combination vase and base in either the stored or upright position comprising an adaptor apparatus coupled to the vase including a first and second adaptor element and a lower lock member comprising a base member having a locking element affixed to one surface thereof (coupled to the base selectively coupled together), the base selectively secured to the vase by an interconnecting member extending between said lower lock member and said first or second adaptor element such that said vase locking device secures the vase to the base in the stored position with said first adaptor element and the vase and base in the upright position with said second adaptor member.

2. The vase locking device of claim 1 wherein said first adaptor element comprises a body having one end portion externally threaded and the opposite end portion having an internally threaded recess formed therein to receive a portion of said interconnecting member.

3. The vase locking device of claim 1 wherein said second adaptor element comprises a body having a threaded recess extending substantially the length thereof to receive a portion of said interconnecting member in combination with an externally threaded end portion to be received in a threaded recess formed in the vase to secure the vase to the base when in the upright position.

4. The vase locking device of claim 1 wherein said locking element comprises a first and second element cooperatively forming a keyway therebetween.

5. The vase locking device of claim 1 wherein an aperture is coaxially formed in said base and said locking element to receive a portion of said interconnecting member therethrough.

6. The vase locking device of claim 1 wherein said interconnecting member comprises an elongated externally threaded element having a wing nut operatively mounted thereon.

7. The vase locking device of claim 6 wherein said interconnecting member further includes a lock nut affixed to the lower portion thereof.

* * * * *